United States Patent
Kamatani et al.

(10) Patent No.: US 9,672,820 B2
(45) Date of Patent: Jun. 6, 2017

(54) SIMULTANEOUS SPEECH PROCESSING APPARATUS AND METHOD

(71) Applicant: KABUSHIKI KAISHA TOSHIBA, Minato-ku, Tokyo (JP)

(72) Inventors: Satoshi Kamatani, Kanagawa (JP); Akiko Sakamoto, Kanagawa (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 141 days.

(21) Appl. No.: 14/490,722

(22) Filed: Sep. 19, 2014

(65) Prior Publication Data
US 2015/0081272 A1 Mar. 19, 2015

(30) Foreign Application Priority Data

Sep. 19, 2013 (JP) .................................. 2013-194639

(51) Int. Cl.
*G10L 15/18* (2013.01)
*G10L 15/26* (2006.01)
*G06F 17/27* (2006.01)

(52) U.S. Cl.
CPC ............ *G10L 15/18* (2013.01); *G06F 17/277* (2013.01); *G10L 15/26* (2013.01)

(58) Field of Classification Search
CPC ......... G10L 15/04; G10L 15/05; G10L 25/87; G10L 15/02
See application file for complete search history.

(56) References Cited

U.S. PATENT DOCUMENTS 6,374,219 B1 * 4/2002 Jiang ....................... G10L 15/05
704/251
8,204,735 B2 6/2012 Kamatani et al.
(Continued)

FOREIGN PATENT DOCUMENTS

JP 9-311694 A 12/1997
JP 11-202895 A 7/1999
(Continued)

OTHER PUBLICATIONS

Kamatani et al; "Simultaneous Interpretation Technology Supporting Conversations in Foreign Languages for Face-to-Face Services", vol. 68, No. 9, 2013, 12 pages.
(Continued)

*Primary Examiner* — Matthew Baker
(74) *Attorney, Agent, or Firm* — Ohlandt, Greeley, Ruggiero & Perle, L.L.P.

(57) ABSTRACT

According to one embodiment, a simultaneous speech processing apparatus includes an acquisition unit, a speech recognition unit, a detection unit and an output unit. The acquisition unit acquires a speech signal. The speech recognition unit generates a decided character string and at least one candidate character string. The detection unit detects a first character string as a processing piece character string if the first character string included in the decided character string exists commonly in one or more combined character strings on dividing the one or more combined character strings by a boundary indicating a morphological position serving as a start position of a processing piece in natural language processing. The output unit outputs the processing piece character string.

17 Claims, 8 Drawing Sheets

(56) References Cited

U.S. PATENT DOCUMENTS

| | | | |
|---|---|---|---|
| 8,521,508 B2 | 8/2013 | Sata | |
| 2001/0020226 A1 | 9/2001 | Minamino et al. | |
| 2005/0075877 A1* | 4/2005 | Minamino | G10L 15/083 704/254 |
| 2006/0136206 A1* | 6/2006 | Ariu | G10L 15/02 704/246 |
| 2006/0212296 A1* | 9/2006 | Espy-Wilson | G10L 15/02 704/254 |
| 2007/0143110 A1* | 6/2007 | Acero | G10L 15/05 704/251 |
| 2008/0177543 A1* | 7/2008 | Nagano | G10L 15/04 704/253 |
| 2008/0195370 A1* | 8/2008 | Neubacher | G10L 15/26 704/1 |
| 2008/0243473 A1* | 10/2008 | Boyd | G06F 17/28 704/2 |
| 2009/0055168 A1* | 2/2009 | Wu | G06F 17/2223 704/10 |
| 2009/0265166 A1* | 10/2009 | Abe | G10L 15/04 704/201 |
| 2011/0054901 A1* | 3/2011 | Qin | G06F 17/2827 704/254 |
| 2011/0218802 A1* | 9/2011 | Bouganim | G10L 15/04 704/211 |
| 2012/0239401 A1* | 9/2012 | Arakawa | G10L 25/87 704/250 |
| 2013/0035938 A1* | 2/2013 | Jung | G10L 15/08 704/251 |
| 2013/0132078 A1* | 5/2013 | Arakawa | G10L 25/78 704/233 |
| 2013/0211818 A1 | 8/2013 | Sakamoto et al. | |
| 2013/0262076 A1 | 10/2013 | Kamatani et al. | |
| 2014/0006007 A1 | 1/2014 | Sumita et al. | |
| 2014/0365220 A1* | 12/2014 | Catchpole | G10L 15/187 704/251 |
| 2015/0134320 A1* | 5/2015 | Rangarajan Sridhar | G06F 17/2775 704/2 |

FOREIGN PATENT DOCUMENTS

| | | |
|---|---|---|
| JP | 2001-242884 A | 9/2001 |
| JP | 2004-12615 A | 1/2004 |
| JP | 2007-79122 A | 3/2007 |
| JP | 2009-58671 A | 3/2009 |
| JP | 2009-217360 A | 9/2009 |
| JP | 2011-92496 A | 5/2011 |
| JP | 2011-191922 A | 9/2011 |
| JP | 2013-164515 A | 8/2013 |
| JP | 2013-206253 A | 10/2013 |
| JP | 2014-10623 A | 1/2014 |
| WO | 2011007627 A1 | 1/2011 |
| WO | 2011/033834 A1 | 3/2011 |

OTHER PUBLICATIONS

Japanese Notification of Reasons for Refusal dated Feb. 3, 2017 from corresponding Japanese Patent Application No. 2013-194639, 6 pages.

* cited by examiner

|   |   |
|---|---|
| Decided character string | Candidate character string |
| 東京都内で Tokyotonaide (in Tokyo) | 火照るん hoterun |
| | ホテルの hoteruno |
| | 掘っているん hotteirun |
| | 補填の hotenno |
| | ⋮ |

301 — Decided character string
302 — Candidate character string

FIG. 3

| 東京 Tokyo | 都内 tonai | で de | 火照る hoteru | ん n | | |
|---|---|---|---|---|---|---|
| B | I | I | B | I | | |
| | | | ホテル hoteru | の no | | |
| | | | B | I | | |
| | | | 掘っ hot | て te | いる iru | ん n |
| | | | B | I | I | I |
| | | | 補填 hoten | の no | | |
| | | | B | I | | |

| Processing piece character string |
|---|
| 東京都内で Tokyotonaide |
| ⋮ |

| Decided character string | Candidate character string |
|---|---|
| ホテルの予約をし *hoterunoyoyakuwoshi* | たいん *tain* |
| | 退院 *taiin* |
| | タイの *taino* |
| | たインド *taindo* |
| ⋮ | ⋮ |

FIG. 6

| ホテル *hoteru* | の *no* | 予約 *yoyaku* | を *wo* | し *shi* | たい *tai* | ん *n* |
|---|---|---|---|---|---|---|
| B | I | I | I | I | I | I |
| | | | | | 退院 *taiin* | |
| | | | | | B | |
| | | | | | タイ *tai* | の *no* |
| | | | | | B | I |
| | | | | | た *ta* | インド *indo* |
| | | | | | I | B |

FIG. 7

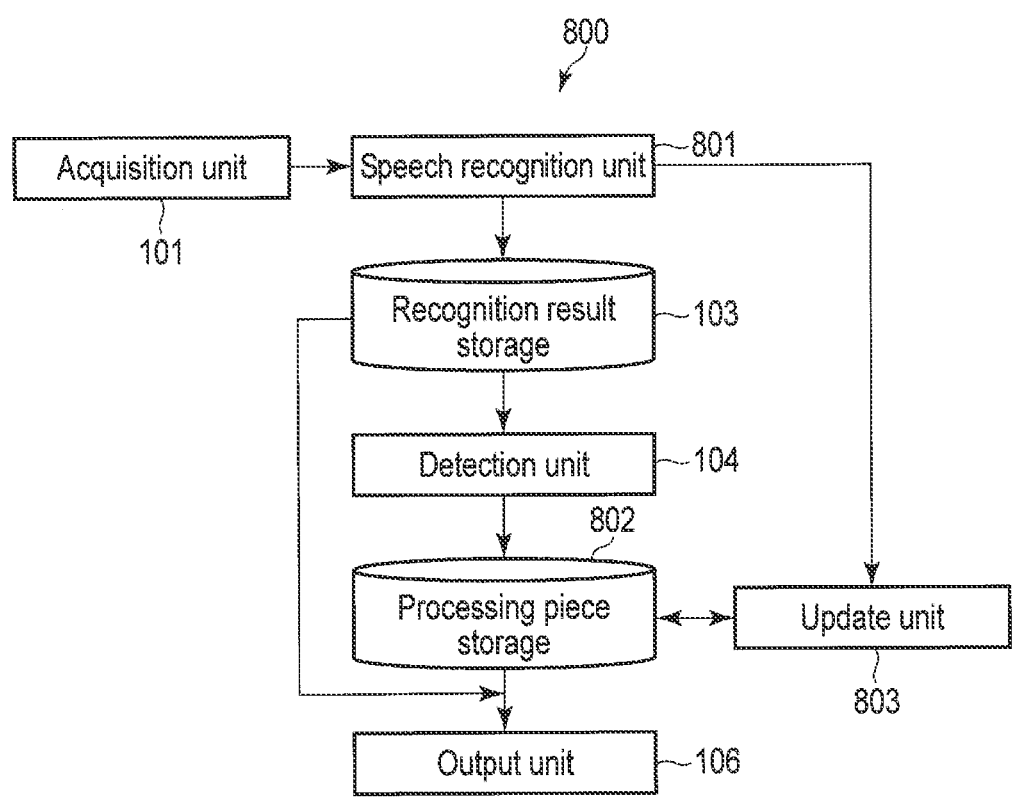
F I G. 8

| Processing piece character string | Start time | End time |
|---|---|---|
| 東京都内で<br>*Tokyotonaide* | 10:03:31.21 | 10:03:32.73 |

501 ⟶ ... 1002 ... 1003 ... 1001 ... 1000

F I G. 10

| 東京<br>*Tokyo* | 都内<br>*tonai* | で<br>*de* |
|---|---|---|
| B | I | I |

1101, 1102

F I G. 11

| Processing piece character string | Start time | End time |
|---|---|---|
| 東京都内で<br>*Tokyotonaide* | 10:03:31.21 | 10:03:32.63 |
| ホテルの予約をしたいんですが<br>*hoterunoyoyakuwo shitaindesuga* | 10:03:32.68 | 10:03:37.55 |
| 良いホテルを見つけて<br>*yoihoteruwo mitsukete* | 10:03:37.72 | 10:03:40.44 |

F I G. 12

| | Processing piece character string | Start time | End time |
|---|---|---|---|
| 1302 | 東京都内で<br>*Tokyotonaide* | 10:03:31.21 | 10:03:32.63 |
| 1303 | ホテルの予約をしたいんですが<br>*hoterunoyoyakuwo shitaindesuga* | 10:03:32.68 | 10:03:37.55 |
| 1304 | 良いホテルを見つけて<br>*yoihoteruwo mitsukete* | 10:03:37.72 | 10:03:40.44 |
| 1301 | もらえませんか<br>*moraemasenka* | 10:03:40.75 | 10:03:41.97 |

F I G. 13

| 東京<br>*Tokyo* | 都内<br>*tonai* | で<br>*de* | ホテル<br>*hoteru* | の<br>*no* | 予約<br>*yoyaku* | を<br>*wo* | し<br>*shi* | たい<br>*tai* | ん<br>*n* | です<br>*desu* | が<br>*ga* |
|---|---|---|---|---|---|---|---|---|---|---|---|
| B | I | I | B | I | I | I | I | I | I | I | I |

| 良い<br>*yoi* | ホテル<br>*hoteru* | を<br>*wo* | 見つけ<br>*mitsuke* | て<br>*te* | もらえ<br>*morae* | ませ<br>*mase* | ん<br>*n* | か<br>*ka* |
|---|---|---|---|---|---|---|---|---|
| B | I | I | I | I | I | I | I | I |

F I G. 14

| | Processing piece character string | Start time | End time |
|---|---|---|---|
| | 東京都内で<br>*Tokyotonaide* | 10:03:31.21 | 10:03:32.63 |
| | ホテルの予約をしたいんですが<br>*hoterunoyoyakuwo shitaindesuga* | 10:03:32.68 | 10:03:37.55 |
| 1501 | 良いホテルを見つけてもらえませんか<br>*yoihoteruwo mitsuketemoraemasenka* | 10:03:37.72 | 10:03:41.97 |

F I G. 15

SIMULTANEOUS SPEECH PROCESSING APPARATUS AND METHOD

CROSS-REFERENCE TO RELATED APPLICATIONS

This application is based upon and claims the benefit of priority from Japanese Patent Application No. 2013-194639, filed Sep. 19, 2013, the entire contents of which are incorporated herein by reference.

FIELD

Embodiments described herein relate generally to a simultaneous speech processing apparatus and method.

BACKGROUND

In recent years, a variety of services such as a speech command system, a speech search system, and a speech interaction system which operate on reception of human utterances along with the advance of speech processing techniques have been used. A human utterance, that is, the spoken language does not have a clear breakpoint such as punctuation marks included in the written language. To provide the above services, a received utterance must be divided into units suitable for such a service. As a technique of dividing the utterance into appropriate processing pieces suitable for such a service, a technique of dividing an utterance including a pause given as a voiceless section into processing pieces is available.

BRIEF DESCRIPTION OF THE DRAWINGS

FIG. 3 is a table illustrating the first example of a decided character string and candidate character strings which are stored in a recognition result storage;

FIG. 4 is a table illustrating the first example of a detection result of boundaries of a combined character string;

FIG. 5 is a table illustrating processing piece character strings stored in a processing piece storage according to the first embodiment;

FIG. 6 is a table illustrating the second example of a decided character string and candidate character strings which are stored in the recognition result storage;

FIG. 7 is a table illustrating the second example of a detection result of boundaries of a combined character string;

FIG. 8 is a block diagram illustrating a simultaneous speech processing apparatus according to the second embodiment;

FIG. 10 is a table illustrating the first example of processing piece information stored in a processing piece storage according to the second embodiment;

FIG. 11 is a table illustrating the detection result of boundaries of a reprocessing piece character string;

FIG. 12 is a table illustrating the second example of processing piece information stored in the processing piece storage;

FIG. 13 is a table illustrating the third example of processing piece information stored in the processing piece storage;

FIG. 14 is a table illustrating the detection result of boundaries of the reprocessing piece character string; and FIG. 15 is a table illustrating an example of updated processing piece information.

DETAILED DESCRIPTION

The above technique uses, as separator information of an utterance, a pause which has a large change depending on a speaker or the way of speaking. For this reason, an appropriate processing piece may not be detected. For example, assume that a character string as the speech recognition result in a speech section separated by a predetermined pause length is divided into processing pieces. In this case, an appropriate pause length given in advance changes depending on the speaker. In addition, the same speaker does not always speak with a predetermined pause length. Therefore, an appropriate processing piece cannot be detected.

When the pause length has a larger threshold value, a time until a processing piece is decided becomes long and degrades the simultaneity of succeeding processing with respect to an original utterance. To the contrary, when the pause length has a smaller threshold value, simultaneity improves, but pieces separated by pauses increase. As a result, choppy processing pieces are detected, which degrades the accuracy of succeeding processing.

In general, according to one embodiment, a simultaneous speech processing apparatus includes an acquisition unit, a speech recognition unit, a detection unit and an output unit. The acquisition unit is configured to acquire a speech signal. The speech recognition unit is configured to generate a decided character string and at least one candidate character string, the decided character string being a character string corresponding to a speech section in which part of the speech signal having undergone speech recognition processing is converted into a character string, the at least one candidate character string being a character string corresponding to a speech section in which a character string as a conversion result is variable during speech recognition processing in a speech section succeeding the decided character string. The detection unit is configured to detect a first character string as a processing piece character string if the first character string included in the decided character string exists commonly in one or more combined character strings on dividing the one or more combined character strings by a boundary, the one or more combined character strings being obtained by connecting the decided character string and the at least one candidate character string, the boundary indicating a morphological position serving as a start position of a processing piece in natural language processing. The output unit is configured to output the processing piece character string.

In the following, a simultaneous speech processing apparatus, method, and program according to the present embodiment will be explained in detail with reference to the drawings. In the description of the embodiment below, the components referenced by the same numbers perform the same operations throughout the embodiment, and repetitive descriptions will be omitted for brevity.

First Embodiment

Figure 1:
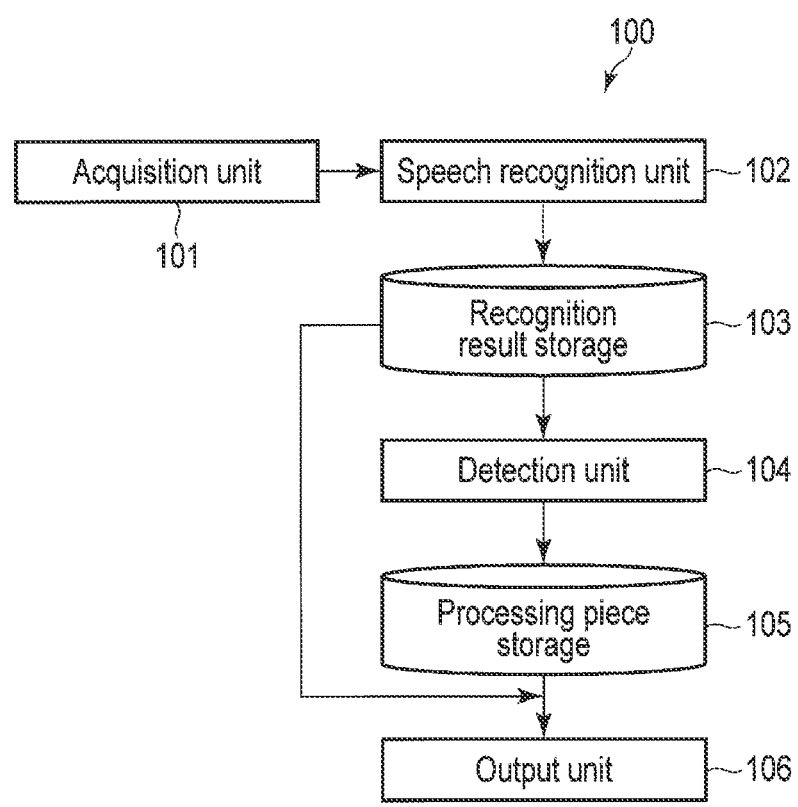
FIG. 1 is a block diagram illustrating a simultaneous speech processing apparatus according to the first embodiment.

A simultaneous speech processing apparatus according to the first embodiment will be described with reference to the block diagram of FIG. 1.

A simultaneous speech processing apparatus 100 according to this embodiment includes an acquisition unit 101, a speech recognition unit 102, a recognition result storage 103, a detection unit 104, a processing piece storage 105, and an output unit 106.

The acquisition unit 101 acquires a speech uttered by a speaker as a speech signal. The speech signal can be obtained by collecting a speech through, for example, a microphone and causing an analog-to-digital converter (A/D converter) to process the speech. Alternatively, a speech recorded on a recording medium in advance may be read out from the recording medium and played back by a playback device, thereby obtaining a speech signal.

The speech recognition unit 102 receives the speech signal from the acquisition unit 101, performs speech recognition processing for the speech signal, and converts the speech signal into a text character string. The speech recognition processing is performed using a general method such as a hidden Markov model (HMM), and a detailed description thereof will be omitted. The speech recognition unit 102 generates, as a decided character string, a character string corresponding to the speech section of a character string having undergone speech recognition processing. The speech recognition unit 102 also generates, as at least one candidate character string, a character string corresponding to a speech section in which a character string as a conversion result is not decided yet during speech recognition processing in a speech section succeeding the decided character string. In other words, the candidate character string is a character string that is variable in the speech recognition processing.

According to the method of generating the decided character string and the candidate character string, for example, these strings are generated using a predetermined voiceless section (pause) in a speech signal as a separator. That is, a most likelihood character string in a state in which at least one candidate corresponding to a speech in a section temporally preceding the pause is determined is defined as the decided character string. At least one character string corresponding to a speech in a section succeeding the pause is defined as a candidate character string. A set of candidate character strings will be referred to as a candidate character string set.

Note that the decided character string may be a most likelihood character string in the decided speech section, or may be generated in a form including another candidate corresponding to the decided speech section, for example, a character string lattice form. Similarly, the candidate character string set may be generated for each candidate character string or output in the character string lattice form.

As another example of the method of generating the decided character string and the candidate character string, a position at which character string candidates corresponding to a speech in speech recognition processing reach a predetermined number of words may be used in place of the pause, or a position at which the generation probability of the character string candidates exceeds a predetermined threshold value may be used in place of the pause, thereby generating the decided character string and the candidate character string.

The recognition result storage 103 receives the decided character string and at least one candidate character string from the speech recognition unit 102 and stores them in association with each other. Note that in this embodiment, the decided character string and the candidate character string assume a plain text having no word information. However, a series of separated words may be stored as the speech recognition processing result of the speech recognition unit 102.

The detection unit 104 acquires the decided character string and the candidate character string set from the recognition result storage 103. The detection unit 104 obtains at least one combined character string by connecting the decided character string and the candidate character strings included in the candidate character string set. The detection unit 104 analyses each combined character string and detects, at a morphological position serving as the start position of the processing piece in succeeding natural language processing, at least one boundary indicating a position at which the combined character string is divided into partial character strings. When a character string included in the decided character string exists commonly in the combined character strings on dividing the combined character strings by boundaries, the detection unit 104 detects the character string included in the decided character string as a processing piece character string. In other method, the boundary can be obtained by a sentence boundary detection. Note that a set of combined character strings is also referred to as a combined character string set.

The processing piece indicates an optimal character string for an operation of another device connected to the simultaneous speech processing apparatus 100. For example, when the simultaneous speech processing apparatus 100 is connected to a machine translation apparatus, the processing piece serves as a translation unit to obtain an optimal translation result by simultaneously and parallelly translating the speech input to the machine translation apparatus. In addition, in a speech interaction such as simultaneous translation requiring high traceability for utterances, the processing piece is equivalent to a unit for simultaneously and parallelly processing the speech as the speech interaction task. This piece serves as a unit for achieving optimal interpretation accuracy and interpretation time using a delay time since an utterance as a variable in addition to the quality of the translation result.

The detection unit 104 can probabilistically estimate a boundary serving as a processing piece using a conditioning random field. In machine learning, learning data (corpus) given with idealistic processing piece information may be used to learn the boundary. Alternatively, a boundary for maximizing the probability for ideally operating an apparatus connected to the simultaneous speech processing apparatus of this embodiment may be learnt for data given with no ideal processing piece information.

A machine learning method is not limited to the above embodiment. In addition to the conditioning random field described with reference to the above embodiment, the boundary may be estimated using other models such as HMM and a support vector machine (SVM). In addition to a method of statistically detecting a boundary, a method using pattern matching in a morphological series, a method using syntactic information, and the like can be used.

The processing piece storage 105 receives and stores the processing piece character string from the detection unit 104.

The output unit 106 receives the decided character string and candidate character string from the recognition result storage 103 and the processing piece character string from the processing piece storage 105 and outputs them externally. The external output may be performed every time the processing piece character string is generated or may be performed at once when some processing piece character strings are accumulated. Note that the simultaneous speech Processing Apparatus may include a display device such as a liquid crystal display (LCD) or an organic light emitting diode (OLED) display, a printer device, an audio device such as a loudspeaker, and a storage device including a storage medium such as a hard disk drive.

Figure 2:
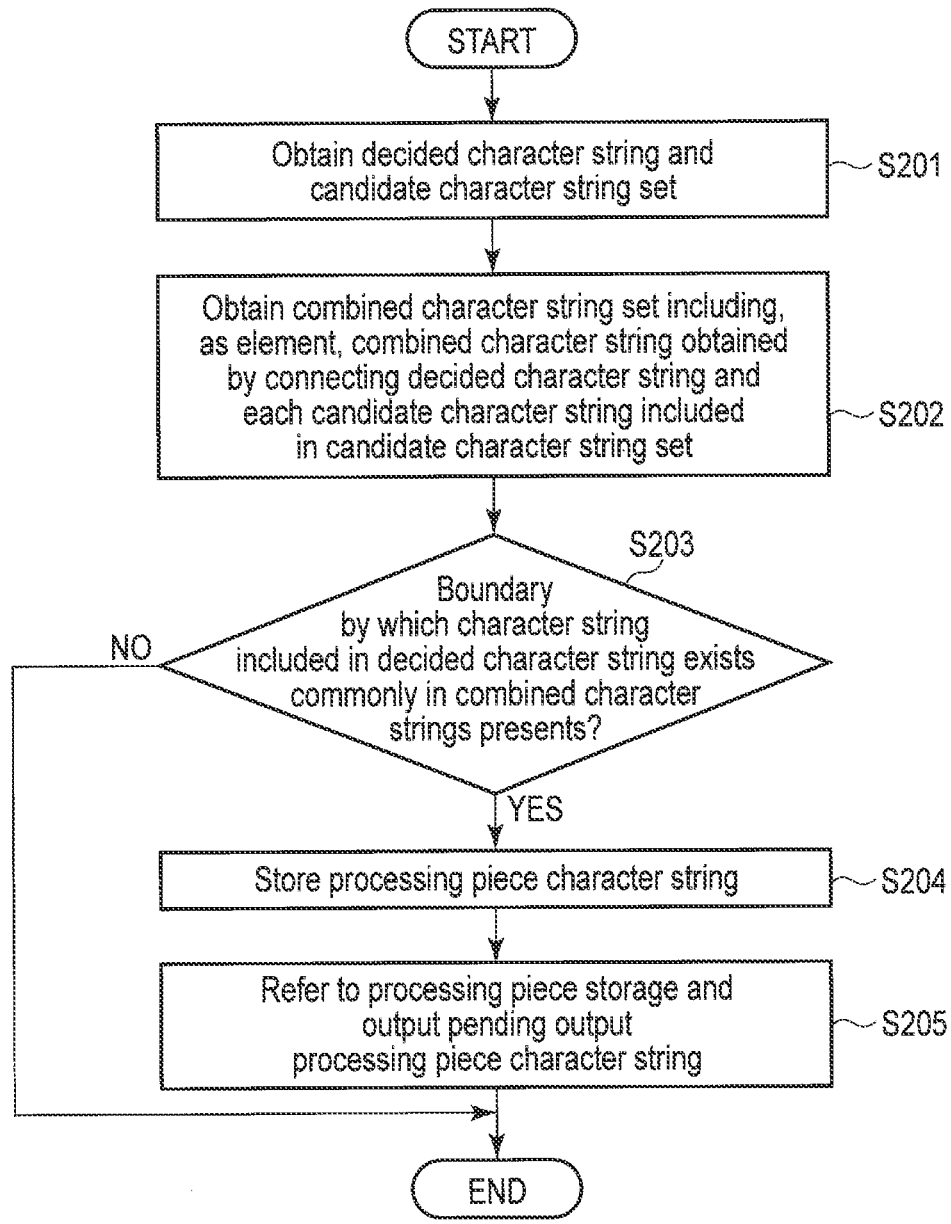
FIG. 2 is a flowchart illustrating an operation of the simultaneous speech processing apparatus according to the first embodiment.

The operation of the simultaneous speech processing apparatus 100 according to the first embodiment will be described with reference to the flowchart in FIG. 2.

In step S201, the speech recognition unit 102 performs speech recognition processing for the speech acquired by the acquisition unit 101 to obtain a decided character string and a candidate character string set.

In step S202, the detection unit 104 connects the decided character string and the candidate character strings included in the candidate character string set to generate combined character strings and a combined character string set having the combined character strings as elements. In this case, the combined character strings corresponding to the number of candidate character strings are generated.

In step S203, the detection unit 104 determines whether or not a boundary by which a character string included in the decided character string exists commonly in the combined character strings when each combined character string is divided using a boundary. If the boundary by which the character string included in the decided character string exists commonly in the combined character strings, the process advances to step S204; otherwise, the processing ends.

In step S204, the processing piece storage 105 stores the character string included in the decided character string as the processing piece character string.

In step S205, the output unit 106 refers to the processing piece storage 105 and outputs a pending output processing piece character string outside. The operation of the simultaneous speech processing apparatus 100 according to the first embodiment is thus complete.

A practical example of the operation of the simultaneous speech processing apparatus 100 according to the first embodiment will be described with reference to FIGS. 3, 4, and 5. In this case, a machine translation apparatus for translating Japanese into English is connected to the simultaneous speech processing apparatus 100.

Assume that a speaker continuously utters the contents "東京都内で (V) ホテルを予約し (V) たいんですが良 いホテルを見つ けて (V) もらえませんか (Tokyotonaide (V) hoteruwo yoyakushi (V) tainodesuga yoihoteruwo mitsukete (V) moraemasenka)" and that the simultaneous speech processing apparatus 100 acquires this utterance. A symbol (V) indicates a position recognized as a voiceless section (pause) by the simultaneous processing apparatus 100.

First of all, for the utterance "東京都内で (Tokyotonaide (V))", the speech recognition unit 102 performs speech recognition processing to generate a decided character string and at least one candidate character string. The decided character string and candidate character strings stored in the recognition result storage 103 will be described with reference to FIG. 3.

The recognition result storage 103 stores a decided character string 301 and at least one candidate character string 302 in association with each other. In this case, the decided character string 301 "Tokyotonaide" is associated with the candidate character strings 302 "火照るん (hoterun)", "ホテルの (hoteruno)", "掘っているん (hotteirun)", and "補填の (hotenno)". The decided character string 301 is connected to each candidate character string 302 to obtain a combined character string. That is, as the combined character strings, "東京都内で火照るん (Tokyotonaide hoterun)" "東京都内でホテルの (Tokyotonaide hoteruno)", "東京都内で掘っているん (Tokyotonaide hotteirun)", and "東京都内で補填の (Tokyotonaide hotenno)" are obtained. A set of these four combined character strings forms a combined character string set.

The division unit 104 analyses the respective combined character strings to detect boundaries. The boundary detection result will be described with reference to FIG. 4.

FIG. 4 shows an example in which labels 402 indicating the candidate positions of boundaries to the processing pieces are assigned to morphemes included in a combined character string 401 using the conditioning random field. "B" indicates the position of a morpheme serving as the start position of the processing piece. "I" indicates the position of a morpheme located midway along the processing piece.

For example, for the combined character string 401 "東京都内で火照るん (Tokyotonaide hoterun)", since it can be divided at the position of the boundary "B" of the label 402 into partial character strings, the combined character string 401 is obviously divided into the character strings "東京都内で (Tokyotonaide)" and "火照るん (hoterun)". Similarly, the combined character string "東京都内でホテルの (Tokyotonaide hoteruno)" can be divided into "東京都内で (Tokyotonaide)" and "ホテルの (hoteruno)" at the position of the boundary of the label 402 "B".

The detection unit 104 detects a boundary by which a character string included in the decided character string exists commonly in the combined character strings 401. In the example of FIG. 4, of the boundaries, the combined character strings 401 can be divided at the label 402 "B" by which the character string included in the decided character string exists commonly in the combined character strings 401. That is, "東京都内で (Tokyotonaide)" as the decided character string exists commonly in the combined character strings. Therefore, "東京都内で (Tokyotonaide)" is detected as the processing piece character string.

FIG. 5 shows an example of storing the processing piece character string obtained by the detection unit 104 in the processing piece storage 105. As shown in FIG. 5, a processing piece character string 501 "東京都内で (Tokyotonaide)" is stored. The output unit 106 then outputs the processing piece character string "東京都内で (Tokyotonaide)" outside.

When the utterance progresses, the acquisition unit 101 acquires the utterance "ホテルを予約し (hoteruwo yoyakushi (V))". The speech recognition unit 102 performs processing of the utterance, thereby obtaining the processing results of the decided character string and the candidate character string set, as shown in FIG. 6.

In this case assume that a decided character string 601 "ホテルの予約をし (hoterunoyoyakuwoshi)" and at least one candidate character string 602 corresponding to the decided character string 601 are obtained. As shown in FIG. 6, as the candidate character strings 602, "たいん (tain)", "退院 (taiin)", "タイの (taino)", and "たインド (taindo)" are obtained.

FIG. 7 shows the result obtained when the detection unit 104 connects the decided character string and each of the candidate character strings shown in FIG. 6 to generate combined character strings and detects the boundaries of the combined character strings.

As shown in FIG. 7, since a combined character string 701 "ホテルの予約 をしたいん (hoterunoyoyakuwo shitain)" does not have a boundary corresponding to a label 702 "B" except for the start element "ホテル (hoteru)", the combined character string 701 cannot be divided into partial character strings. To the contrary, a combined characters string 701 "ホテルの予約 をしたいん (hoterunoyoyakuwo shitaiin)" has a boundary corresponding to a label 702 "B" other than the start element, and can be divided into character strings "ホテルの予約をし (hoterunoyoyakuwo shi)" and "たいん (taiin)". In addition, labels 702 corresponding to the start character string portions of the candidate character strings are obtained as a label 702 "B" of the character string "タイの (taino)" and a label 702 "I" of the character string "タインド (taindo)".

In this case, a character string included in the decided character string as a result of division by a boundary does not exist commonly in all the combined character strings 701, that is, the boundary does not exist commonly in the labels 702 "B" of the combined character strings. Therefore, a new processing piece character string is not generated or added to the processing piece storage 105.

When a conventional method using a pause in an utterance as a clue is used, a portion "ホテルの予約をし (hoterunoyoyakuwoshi)" corresponding to the utterance "ホテ ルの予約をし (hoterunoyoyakuwo shi (V))" is detected as the processing piece. The subsequent character string "たいんで すがどこ に行けば (taindesuga dokoniikeba)" is separately processed as another processing piece. This indicates that the translation results are separated into "I book a hotel" and "I want, but where should I go" when the divided character strings are used as the processing pieces of the machine translation apparatus. The intention of the original utterance cannot be correctly reflected.

To the contrary, in the simultaneous speech processing apparatus according to the first embodiment, since the context of the utterance is analyzed to detect a processing piece, the apparatus can prevent the output of a processing piece which does not correctly reflect the intention of the original utterance.

More specifically, the first embodiment can divide the recognition result of the uttered speech into appropriate processing pieces. When the simultaneous speech processing apparatus is connected to, for example, a machine translation apparatus, appropriate translation for each processing piece character string can be performed. The translation result can be progressively output while concurrently tracking the utterance.

Second Embodiment

The second embodiment is different from the first embodiment in that information about a processing piece character string is updated depending on an utterance condition. With this operation, even if an appropriate processing piece changes in accordance with the recognition result of a succeeding speech, a processing piece which correctly reflects the intention of an original utterance can be output.

The block diagram of a simultaneous speech processing apparatus according to the second embodiment will be described with reference to FIG. 8.

A simultaneous speech processing apparatus 800 according to the second embodiment includes an acquisition unit 101, a recognition result storage 103, a detection unit 104, an output unit 106, a speech recognition unit 801, a processing piece storage 802, and an update unit 803.

The acquisition unit 101, the recognition result storage 103, the detection unit 104, and the output unit 106 are the same as in the first embodiment, and a description thereof will be omitted.

The speech recognition unit 801 performs the same processing as in the speech recognition unit 102 of the first embodiment, except that the speech recognition unit 801 acquires time information about time at which a speech is uttered and a rate of speech (to be referred to as a speech rate hereinafter) uttered by a speaker.

The processing piece storage 802 performs the same processing as in the processing piece storage 105 of the first embodiment, except that the processing piece storage 802 stores, in association with each other as the processing piece information, a processing piece character string and time information of a speech corresponding to a section in which the processing piece character string is detected.

The update unit 803 refers to the processing piece information stored in the processing piece storage 802 and determines whether or not processing piece information corresponding to a section of speeches continuously uttered within a preset time temporally preceding new processing piece information is present when the new processing piece information is added to the processing piece storage 802. This determination may be performed by receiving at least one of the time information and the speech rate from the speech recognition unit 801 and referring to the received information.

When processing piece information corresponding to the section of speeches continuously uttered within the preset time is present before the added processing piece information, the update unit 803 further connects the processing piece character strings included in the corresponding processing piece information in time series, thereby generating a reprocessing piece character string. In addition, when the boundary of the reprocessing piece character string is different from the boundary of the processing piece character string stored in the processing piece storage 802, the processing piece character string included in the previously connected processing piece information and the time information are replaced with the reprocessing piece character string and the time information corresponding to the reprocessing piece character string.

For example, when time information is referred to, a threshold, value used to determine the section of the speeches continuously uttered may be set based on a difference between the end time of the speech corresponding to the preceding processing piece information and the start time of the speech corresponding to the succeeding processing piece information. The threshold value may be set based on a sum of time lengths of continuous processing piece information as evaluation targets.

Note that when the speech rate is referred to, the threshold value of a pause length may be determined by the statistic value of the speech rate of one or more speakers. Alternatively, the speech rate for each speaker is obtained in advance, and the threshold value may be set for each speaker. The threshold value may be a value set in advance or may be dynamically set depending on an utterance situation.

An operation of the simultaneous speech Processing Apparatus 800 according to the second embodiment will be described with reference to the flowchart in FIG. 9.

The processing from step S201 to step S203 and in step S205 is the same as in the simultaneous speech Processing Apparatus 100 according to the first embodiment, and a description thereof will be omitted.

In step S901, the processing piece storage 802 stores, as processing piece information, the processing piece character string and the time information of a speech section corresponding to the processing piece character string in association with each other.

In step S902, the update unit 803 determines whether or not pending output processing piece information exists. If the pending output processing piece information exists, the process advances to step S903; otherwise, the process advances to step S205.

In step S903, if there are a plurality of processing piece character strings continuously uttered within a preset time, the plurality of processing piece character strings are connected in the time-series order, thereby generating a reprocessing piece character string.

In step S904, the update unit 803 detects the boundaries of the reprocessing piece character string. The method of detecting the boundaries is the same as in the method of calculating the boundaries in the detection unit 104.

In step S905, it is determined whether or not the update unit 803 detects a boundary of the reprocessing piece character string, which is different from the boundary of the processing piece character string stored in the processing piece storage 802. If a different boundary is detected, the process advances to step S906; otherwise, the process advances to step S205.

In step S906, the update unit 803 updates the processing piece information stored in the processing piece storage 802 with new processing piece information including the reprocessing piece character string. The process then advances to step S205. The operation of the simultaneous speech processing apparatus 800 according to the second embodiment has thus been described.

An example of processing piece information stored in the processing piece storage 802 according to the second embodiment will be described with reference to FIG. 10.

FIG. 10 is a table illustrating processing piece information 1000. A processing piece character string 501 and time information 1001 are stored in association with each other as the processing piece information 1000. As the time information 1001, start time 1002 and end time 1003 of a speech corresponding to a section in which the processing piece character string 501 was detected are associated with the processing piece character string 501. More specifically, the processing piece character string 501 "東京都内で (Tokyotonaide)" and the start time 1002 "10:03:31.21" and the end time 1003 "10:03:32.73" are associated with each other.

A detailed example of the operation of the simultaneous speech processing apparatus 800 according to the second embodiment will be described with reference to FIGS. 11, 12, 13, 14, and 15.

The processing piece character string "東京都内で (Tokyotonaide)" included in the processing piece information 1000 shown in FIG. 10 is pending output. Assume that the character strings corresponding to the utterances continuously made within the preset time include only "東京都内で (Tokyotonaide)". At this time, in processing of step S902, the update unit 803 determines that pending output processing piece information exists and detects a boundary in the processing piece character string "東京都内で (Tokyotonaide)".

FIG. 11 shows the boundary detection result of the reprocessing piece character string. Since labels 1102 corresponding to a reprocessing piece character string 1101 "東京都内で (Tokyotonaide)" are the same as the labels (the labels "B, I, and I" of "東京都内で (Tokyotonaide)" of FIG. 4) of the boundaries detected for the processing piece character string 501 shown in FIG. 5, the processing of the update unit 803 ends.

FIG. 12 shows an example in which an utterance further continues, the speech recognition unit 102 acquires speeches "たいんですが良いホテルを見つけて (taindesuga yoihoteruwo mitsukete (V))" succeeding the speeches uttered in the first embodiment, the detection unit 104 analyzes the acquired character string, and the processing piece storage 802 stores "良いホテルを見つけて (yoihoteruwo mitsukete)" as the processing piece information.

Assume a state in which all pieces of processing piece information shown in FIG. 12 are output from the output unit 106, that is, a state in which "東京都内で (Tokyotonaide)", "ホテルの予約を したいんですが (hoterunoyoyakuwo shitaindesuga)", and "良いホテルを見つけて (yoihoteruwo mitsukete)" are output in order. In this case, when the simultaneous speech processing apparatus 800 is connected to a machine translation apparatus, assume that "In Tokyo city", "I'd like to make a hotel reservation", and "Please find a good hotel" are output.

The acquisition unit 101 then acquires speeches "もらえ ませんか (moraemasenka)", and "もらえませんか (moraemasenka)" is obtained as the processing piece character string of a new utterance in the processing of the speech recognition unit 102 and the detection unit 104. After that, this processing piece character string is associated with the start time and end time of the speech section corresponding to this processing piece character string, thereby storing the result as the processing piece information in the processing piece storage 802. The above example is shown in FIG. 13.

Figure 9:
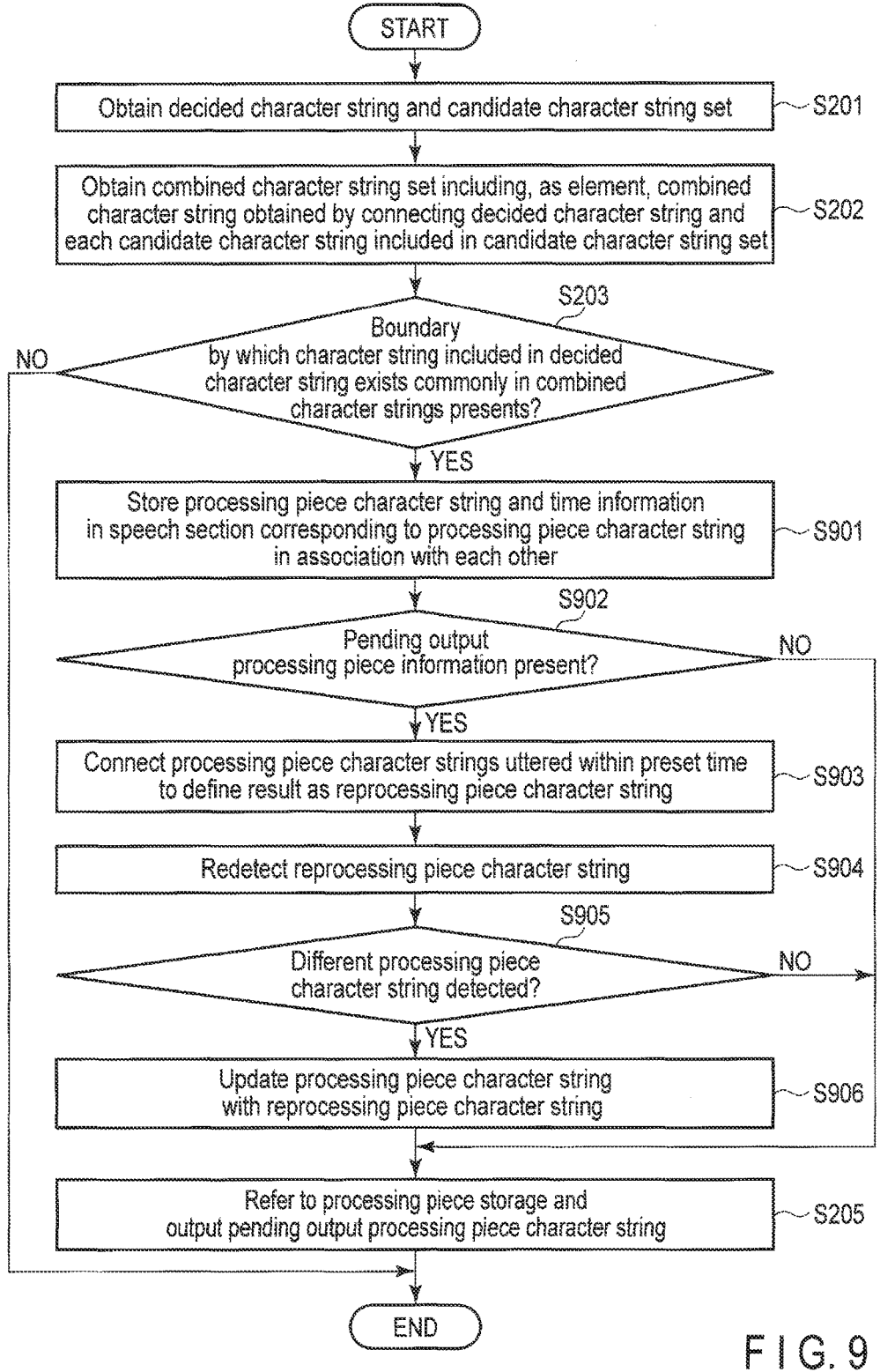
FIG. 9 is a flowchart illustrating an operation of the simultaneous speech processing apparatus according to the second embodiment.

In the updating processing of the update unit 803 shown in FIG. 9, since processing piece information 1301 "もらえませんか (moraemasenka)" is pending output, the processing piece information 1301 "もらえませんか (moraemasenka)" becomes a processing target. At this time, when a threshold value to determine whether utterances continue is 1 sec, a difference between the utterances, that is, between processing piece information 1302 "東京都内 で (Tokyotonaide)" and processing piece information 1303 "ホ テルを予約し たいんですが (hoteruwo yoyakushitaindesuga)" is 0.05 sec. A difference between the processing piece information 1303 "ホテルを予約 したいんですが (hoteruwo yoyakushitaindesuga)" and processing piece information 1304 "良いホテル を見つけて (yoihoteruwo mitsukete)" is 0.17 sec. A difference between the processing piece information 1304 "良いホテル を見つけて (yoihoteruwo mitsukete)" and the processing piece information 1301 "もらえませんか (moraemasenka)" is 0.31 sec. The utterances corresponding to these pieces of processing piece information are determined to be continuously made within the preset time. Therefore, a combined character string "東京都内でホテ ルを予約したい んですが良いホテ ルを見つけてもら えませんか (Tokyotonaide hoterunoyoyakuwo shitaindesuga yoihoteruwo mitsuketemoraemasenka)" as a character string obtained by connecting the above processing piece character strings in time series is generated as a reprocessing piece character string.

FIG. 14 shows the boundary detection result of the reprocessing piece character string "東京都内でホテルを予約した いんですが良 いホテルを見つ けてもらえ ませんか (Tokyotonaide hoterunoyoyakuwo shitaindesuga yoihoteruwo mitsuketemoraemasenka)".

As the boundary detection result, as shown in FIG. 14, a processing piece character string "良いホテルを見 つけてもらえ ませんか (yoihoteruwo mitsuketemoraemasenka)" different from the processing piece character strings "良いホテル

を見つけて (yoihoteruwo mitsukete)" and "もらえませんか (moraemasenka)" shown in FIG. 13 is detected.

FIG. 15 shows finally updated processing piece information in the processing piece storage 802.

As the processing piece information, the processing piece information 1304 "良いホテル を見つけて (yoihoteruwo mitsukete)" and the processing piece information 1301 "もらえませんか (moraemasenka)" shown in FIG. 13 are updated to processing piece information 1501 "良いホテルを 見つけて もらえま せんか (yoihoteruwo mitsuketemoraemasenka)" shown in FIG. 15. The start time 1002 and end time 1003 corresponding to the speeches of the processing piece character string "良いホテルを見つけてもらえませんか (yoihoteruwo mitsuketemoraemasenka)" are updated to the start time "10:03:37.72" of the processing piece information 1304 "良いホテル を見つけて (yoihoteruwo mitsukete)" and the end time "10:03:41.97" of the processing piece information 1301 "もらえませんか (moraemasenka)".

Note that if the update unit 803 is not provided, the processing piece is not updated. In this case, since all the processing piece character strings corresponding to the pieces of processing piece information shown in FIG. 13 are output, translation is sequentially made such that "In Tokyo", "I'd like to make a hotel reservation", "Please find a good hotel", and "I cannot get it?". A character string "もらえないです ? (moraenaidesu)" which is not present in the original utterance may be additionally translated. To the contrary, in the simultaneous speech processing apparatus according to the second embodiment, since "良いホ テルを見つけ てもらえませんか (yoihoteruwo mitsuketemoraemasenka)" is obtained as the machine translation of the processing piece character strings, for example, a translated sentence "Could you find a good hotel for me?" can be obtained when the processing piece character strings are input to the machine translation apparatus.

According to the second embodiment described above, even if appropriate processing pieces change in accordance with the recognition result of succeeding utterances, the processing pieces which correctly reflect the intention of the original utterance can be output.

The flow charts of the embodiments illustrate methods and systems according to the embodiments. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produces an article of manufacture including instruction means which implements the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A simultaneous speech processing apparatus, comprising:
   a storage to store, as processing piece information, the processing piece character string and time information of a speech signal corresponding to a speech section in which the processing piece character string is uttered, in association with each other; and
   a processor programmed to:
   acquire a speech signal;
   generate a decided character string and at least one candidate character string, the decided character string being a character string corresponding to a speech section in which part of the speech signal having undergone speech recognition processing is converted into a character string, the at least one candidate character string being a character string corresponding to a speech section in which a character string as a conversion result is variable during speech recognition processing in a speech section succeeding the decided character string;
   detect a first character string as a processing piece character string if the first character string included in the decided character string exists commonly in one or more combined character strings on dividing the one or more combined character strings by a boundary, the one or more combined character strings being obtained by connecting the decided character string and the at least one candidate character string, the boundary indicating a morphological position serving as a start position of a processing piece in natural language processing;
   output the processing piece character string; and
   if a first processing piece information as new processing piece information is added in the storage and a second processing piece information exists, connect processing piece character strings included in the second processing piece information and the first processing piece information in time series to generate a reprocessing piece character string, and update the processing piece information stored in the storage with the reprocessing piece character string and time information corresponding to the reprocessing piece character string, the second processing piece information preceding the first processing piece information and corresponding to a speech section in which the second processing piece information is uttered continuously within a time falling within a threshold value.

2. The apparatus according to claim 1, wherein the processor is further programmed to update a previously acquired processing piece character string if positions of the boundary are different between the previously acquired processing piece character string and a processing piece character sting that a newly acquired processing piece character sting is added to the previously acquired processing piece character string.

3. The apparatus according to claim 1, wherein the processor is programmed to
   acquire time information about a time during which the processing piece character string is uttered, and determine—with reference to the time information whether or not the second processing piece information exists.

4. The apparatus according to claim 1, wherein the processor is programmed to
acquire a speech rate which indicates a rate at which a speaker speaks, and
determine—with reference to the speech rate whether or not the second processing piece information exists.

5. The apparatus according to claim 1, wherein if the natural language processing is machine translation, the processing piece is a translation device suitable for simultaneously translating in parallel the speech signal.

6. The apparatus according to claim 1, wherein if the natural language processing is speech interaction, the processing piece is a device for simultaneously outputting in parallel the speech signal as a speech interaction task.

7. A simultaneous speech processing method, comprising:
storing, as processing piece information, the processing piece character string and time information of a speech signal corresponding to a speech section in which the processing piece character string is uttered, in association with each other in the storage;
acquiring a speech signal;
generating a decided character string and at least one candidate character string, the decided character string being a character string corresponding to a speech section in which part of the speech signal having undergone speech recognition processing is converted into a character string, the at least one candidate character string being a character string corresponding to a speech section in which a character string as a conversion result is variable during speech recognition processing in a speech section succeeding the decided character string;
detecting a first character string as a processing piece character string if the first character string included in the decided character string exists commonly in one or more combined character strings on dividing the one or more combined character strings by a boundary, the one or more combined character strings being obtained by connecting the decided character string and the at least one candidate character string, the boundary indicating a morphological position serving as a start position of a processing piece in natural language processing;
outputting the processing piece character string; and
connecting, if first processing piece information as new processing piece information is added in the storage and second processing piece information exists, processing piece character strings included in the second processing piece information and the first processing piece information in time series to generate a reprocessing piece character string, and updating the processing piece information stored in the storage with the reprocessing piece character string and time information corresponding to the reprocessing piece character string, the second processing piece information preceding the first processing piece information and corresponding to a speech section in which the second processing piece information is uttered continuously within a time falling within a threshold value.

8. The method according to claim 7, further comprising updating a previously acquired processing piece character string if a position of the boundary changes in accordance with a relationship between a newly acquired processing piece character string and the previously acquired processing piece character string.

9. The method according to claim 7, wherein
the generating the decided character string acquires time information about a time during which the processing piece character string is uttered, and
the updating the processing piece information determines with reference to the time information whether or not the second processing piece information exists.

10. The method according to claim 7, wherein
the generating the decided character string acquires a speech rate which indicates a rate at which a speaker speaks, and
the updating the processing piece information determines with reference to the speech rate whether or not the second processing piece information exists.

11. The method according to claim 7, wherein if the natural language processing is machine translation, the processing piece is a translation device suitable for simultaneously translating in parallel the speech signal.

12. The method according to claim 7, wherein if the natural language processing is speech interaction, the processing piece is a device for simultaneously outputting in parallel the speech signal as a speech interaction task.

13. A non-transitory computer readable medium including computer executable instructions, wherein the instructions, when executed by a processor, cause the processor to perform a method comprising:
storing, as processing piece information, the processing piece character string and time information of a speech signal corresponding to a speech section in which the processing piece character string is uttered, in association with each other in the storage;
acquiring a speech signal;
generating a decided character string and at least one candidate character string, the decided character string being a character string corresponding to a speech section in which part of the speech signal having undergone speech recognition processing is converted into a character string, the at least one candidate character string being a character string corresponding to a speech section in which a character string as a conversion result is variable during speech recognition processing in a speech section succeeding the decided character string;
detecting a first character string as a processing piece character string if the first character string included in the decided character string exists commonly in one or more combined character strings on dividing the one or more combined character strings by a boundary, the one or more combined character strings being obtained by connecting the decided character string and the at least one candidate character string, the boundary indicating a morphological position serving as a start position of a processing piece in natural language processing;
outputting the processing piece character string; and
connecting, if first processing piece information as new processing piece information is added in the storage and second processing piece information exists, processing piece character strings included in the second processing piece information and the first processing piece information in time series to generate a reprocessing piece character string, and updating the processing piece information stored in the storage with the reprocessing piece character string and time information corresponding to the reprocessing piece character string, the second processing piece information preceding the first processing piece information and corresponding to a speech section in which the second processing piece information is uttered continuously within a time falling within a threshold value.

14. The medium according to claim 13, further comprising updating a previously acquired processing piece character string if a position of the boundary changes in accordance with a relationship between a newly acquired processing piece character string and the previously acquired processing piece character string.

15. The medium according to claim 13, wherein
the generating the decided character string acquires time information about a time during which the processing piece character string is uttered, and
the updating the processing piece information determines with reference to the time information whether or not the second processing piece information exists.

16. The medium according to claim 13, wherein
the generating the decided character string acquires a speech rate which indicates a rate at which a speaker speaks, and
the updating the processing piece information determines with reference to the speech rate whether or not the second processing piece information exists.

17. The medium according to claim 13, wherein if the natural language processing is machine translation, the processing piece is a translation device suitable for simultaneously translating in parallel the speech signal.

* * * * *